United States Patent
Mejri et al.

(10) Patent No.: US 10,291,438 B2
(45) Date of Patent: May 14, 2019

(54) METHODS AND DEVICES FOR DECODING DATA SIGNALS

(71) Applicant: INSTITUT MINES-TELECOM, Paris (FR)

(72) Inventors: Asma Mejri, Antibes (FR); Mohamed-Achraf Khsiba, Paris (FR); Ghaya Rekaya Ben-Othman, Antony (FR)

(73) Assignee: INSTITUT MINES-TELEOM, Paris (FR)

( * ) Notice: Subject to any disclaimer, the term of this patent is extended or adjusted under 35 U.S.C. 154(b) by 0 days.

(21) Appl. No.: 15/476,009

(22) Filed: Mar. 31, 2017

(65) Prior Publication Data

US 2017/0295037 A1 Oct. 12, 2017

(30) Foreign Application Priority Data

Apr. 8, 2016 (EP) .................................. 16305417

(51) Int. Cl.
*H04L 25/02* (2006.01)
*H04L 25/03* (2006.01)
(Continued)

(52) U.S. Cl.
CPC ........ *H04L 25/0242* (2013.01); *H04L 1/0631* (2013.01); *H04L 25/03292* (2013.01);
(Continued)

(58) Field of Classification Search
CPC ......... H04L 25/02; H04L 25/03; H04L 27/06; H04B 7/04
See application file for complete search history.

(56) References Cited

U.S. PATENT DOCUMENTS

| | | |
|---|---|---|
| 2006/0259535 A1 | 11/2006 | Cioffi et al. |
| 2009/0103641 A1* | 4/2009 | Masui ................. H04L 25/0206 |
| | | 375/260 |

(Continued)

FOREIGN PATENT DOCUMENTS

| | | |
|---|---|---|
| EP | 15306808.5 A1 | 5/2017 |
| KR | 1020120104345 | 9/2012 |
| WO | 2008056866 A1 | 5/2008 |

OTHER PUBLICATIONS

European Search Report for 16305417.4 dated Oct. 17, 2016.
(Continued)

*Primary Examiner* — Jaison Joseph
(74) *Attorney, Agent, or Firm* — Meagher Emanuel Laks Goldberg & Liao, LLP (57) ABSTRACT

An exemplary decoder is provided for decoding a signal received through a transmission channel in a communication system. The exemplary decoder comprises a transformation unit configured to determine a set of auxiliary channel matrices, each auxiliary channel matrix being determined by performing a linear combination of at least one of the column vectors of the channel matrix; a decomposition unit configured to determine a decomposition of each auxiliary channel matrix into an upper triangular matrix and an orthogonal matrix; a matrix selection unit configured to select at least one auxiliary channel matrix among the set of auxiliary channel matrices depending on a selection criterion related to the components of the upper triangular matrices. The decoder determines at least one estimate of vector of information symbols from an auxiliary signal and from the upper triangular matrix corresponding to a selected auxiliary channel matrix by applying a decoding algorithm.

17 Claims, 5 Drawing Sheets

(51) Int. Cl.
H04L 27/06 (2006.01)
H04L 1/06 (2006.01)
H04B 7/0413 (2017.01)

(52) U.S. Cl.
CPC ........ *H04L 25/03891* (2013.01); *H04L 27/06* (2013.01); *H04B 7/0413* (2013.01); *H04L 2025/03426* (2013.01)

(56) References Cited

U.S. PATENT DOCUMENTS

2010/0042666 A1* 2/2010 Park ............ H04B 7/0413 708/212
2012/0263471 A1 10/2012 Buchali et al.

OTHER PUBLICATIONS

A. K. Lenstra, H. W. Lenstra, and H. W. Lovász. "Factoring polynomials with rational coefficients." Mathematische Annalen 261 (4): 515-534. 1982.

J. Jalden and P. Elia, "DMT Optimality of LR-Aided Linear Decoders for a General Class of Channels, Lattice Designs, and System Models", IEEE Transactions on Information Theory, vol. 56, Issue 10, pp. 4765-4780, Oct. 2010.

G.J. Foschini. "Layered Space-Time Architecture for Wireless Communication in a Fading Environment When Using Multi-Element Antennas." Bell Labs Tech. J. vol. 1, pp. 41-59. 1996.

M.-O. Damen, H. El-Gamal, and G. Caire. "On maximum-likelihood detection and the search for the closest lattice point." Information Theory, IEEE Transactions on, vol. 49, issue 10, pp. 2389-2402, 2003.

E. Viterbo and J. Boutros. "A universal lattice code decoder for fading channels." IEEE Transactions on Information Theory, 45(5):1639-1642, Jul. 1999.

R. Fano. "A heuristic discussion of probabilistic decoding." IEEE Transactions on Information Theory, 9(2):64-74, 1963.

G.R. Ben-Othman, R. Ouertani, and A. Salah. "The spherical bound stack decoder." In Proceedings of International Conference on Wireless and Mobile Computing, pp. 322-327, Oct. 2008.

Won-Joon Choi, R. Negi, and J.M. Cloth. "Combined ML and DFE decoding for the V-BLAST system." IEEE International Conference on Communications. vol. 3, pp. 1243-1248, 2000.

D. N. Dao, C. Yuen, C. Tellambura, Y. L. Guan, and T.T. Tjhung. "Four-group decodable space-time block codes." IEEE Transactions on Signal Processing, 56(1):424-430, Jan. 2008.

E. Biglieri, Y. Hong, and E. Viterbo. "On fast-decodable space-time block codes." In IEEE International Zurich Seminar on Communications, 116-119, Mar. 2008.

T. P. Ren, Y. L. Guan, C. Yuen, and R. J. Shen. "Fast-group-decodable space-time block code." In Proceedings of IEEE Information Theory Workshop, pp. 1-5, Jan. 2010.

KR Office Action issued in corresponding KR application No. 10-2017-0044109 dated Jul. 5, 2018.

* cited by examiner

METHODS AND DEVICES FOR DECODING DATA SIGNALS

TECHNICAL FIELD

The invention generally relates to digital communication and in particular to methods and devices for decoding a data signal.

BACKGROUND

Multipath propagation is a propagation phenomenon that causes signals to reach receiver equipments or devices through two or more paths. Multipath propagation also causes interference between different signals travelling through a same communication media or between different components of a same signal. Such phenomena may happen for example in wired communication links due to signal reflections caused for instance by impedance mismatches. In digital radio communications, multipath propagation may happen due to signal reflection by atmospheric and terrestrial objects. In optical communication systems, the dispersion and multiple reflections of the optical fiber propagation environment may induce a multipath propagation.

Destructive interference, mainly inter-symbol interference (ISI), which results from multipath propagation can cause errors and affect the quality of communications. Signal processing techniques such as equalizers, orthogonal multi-carrier modulation and rake receivers may be used to correct the problem of ISI.

Multiple antenna technologies have been proposed to transform multipath propagation from a nuisance to be avoided into a source for increasing and possibly multiplying the capacity of wired, wireless and optical communication systems. In such communication systems, transmit/receive antennas at transceiver devices, sub-carriers in a multi-carrier modulation system or different propagation modes and polarization states in optical fiber communications can advantageously be used to carry information from one or multiple transmitters to one or many receivers.

Multipath propagation of wired, wireless or optical communication media can be harnessed to increase transmission rates using Space-Time coding and decoding techniques. Space-Time encoders are implemented in transmitter devices to encode a flow of information symbols and transmit encoded symbols. Space-Time encoders can use one or more transmit antennas, during several time slots, and over a plurality of sub-carriers. At receiver devices, Space-Time decoders are used to recover intended information streams conveyed by transmitter devices.

Space-Time coding and decoding techniques have been initially developed for wireless Multi-antenna technologies implemented in wireless Multi-antenna systems (MIMO), known as single-user MIMO. Such systems comprise a pair of transmitter/receiver, each being equipped with one or many antennas. Space-Time coding and decoding techniques have been integrated in various wireless communication systems and networks involving many pairs of inter-communicating users and possibly in combination with multiple access techniques like Time Division Multiple Access (TDMA), Frequency Division Multiple Access (FDMA), Code Division Multiple Access (CDMA), and Space-Division Multiple Access (SDMA). Space-Time coding and decoding techniques may be further implemented in combination with multi-carrier modulation formats such as OFDM (Orthogonal Frequency Division Multiplexing) and FBMC (Filter Bank MultiCarrier).

In addition to wireless communications, Space-Time coding and decoding techniques can also be used to provide high transmission rates in optical-fiber links over long distances. Moreover, Space-Time coding and decoding techniques can be efficiently implemented in optical fiber-based transmission systems to combat losses and impairments of the optical transmission medium. Exemplary applications comprise Polarization Division Multiplexed systems (PMD) and Mode Division Multiplexed systems (MDM).

Benefits of Space-Time coding and decoding techniques in terms of increasing transmission rates paved the way for their development and implementation in a variety of communication standards. Exemplary applications comprise power-line wired communications standardized in the ITU G.hn and HomePlug AV2 specifications, wireless adhoc communications standardized for example in Wi-Fi (IEEE 802.11n and IEEE 802.11ac), and cellular communications standardized in many systems such as HSPA+ (3G), WiMAX (4G), Long Term Evolution (LTE), and future 5G.

Due to multipath propagation, information symbols originating from the various inputs of a MIMO communication system are superposed at receiver devices. The received signal or channel output is a set of linear combinations of the various information symbols sent by one or more transmitters, using one or more antennas, during one or more time slots and over one or more sub-carriers. The goal of a receiver device in a MIMO system is to solve this set of linear combinations for recovering the original information. A Space-Time decoder may be implemented for reaching such a goal.

A Space-Time decoder delivers, given the MIMO channel output and a channel matrix representative of the transmission channel, an estimation of the original information symbols.

The decoding process implemented in a Space-Time decoder may be broken down into two different stages: a preprocessing stage and an estimation stage. The aim of the first stage is to transform the channel matrix into an equivalent or near-equivalent matrix having better conditioning or orthogonality properties. Such properties enable a computational complexity reduction and/or performance improvement of the estimation stage. Exemplary preprocessing techniques include lattice reduction, Minimum Mean Square Equalization-Generalized Decision Feedback Equalization (MMSE-GDFE) filtering and ordering methods such as V-BLAST and H-norm orderings. Lattice reduction techniques may be used in order to obtain a channel matrix of quasi-orthonormal column vectors. An example of reduction techniques is the LLL reduction disclosed in "A. K. Lenstra, H. W. Lenstra, and H. W. Lovász. Factoring polynomials with rational coefficients. Mathematische Annalen 261 (4): 515-534. 1982". MMSE-GDFE filtering disclosed in "J. Jalden and P. Elia, DMT Optimality of LR-Aided Linear Decoders for a General Class of Channels, Lattice Designs, and System Models, IEEE Transactions on Information Theory, volume 56, Issue 10, pages 4765-4780" may be used to obtain a well conditioned channel matrix. Ordering techniques may be used to change the decoding order of the different information symbols. Exemplary ordering techniques are the V-Blast disclosed for example in "G. J. Foschini. Layered Space-Time Architecture for Wireless Communication in a Fading Environment When Using Multi-Element Antennas. Bell Labs Tech. J. Volume 1, pages 41-59. 1996" and H-norm ordering disclosed for example in "M.-O. Damen, H. El-Gamal, and G. Caire. On maximum-likelihood detection and the search for the closest lattice point. Information Theory, IEEE Transactions on, volume 49, issue 10, pages 2389-2402, 2003".

In the second stage, a decoding algorithm may be implemented to determine, from the transformed channel matrix, an estimation of the original information symbols. A variety of decoding algorithms exist. Decoding algorithms can be generally categorized as joint, single-stream or sub-block decoders, depending on whether the different streams constituting the vector of original information symbols are decoded jointly, individually, or in groups of sub-vectors respectively. The choice of a decoding algorithm may depend on the available computational resources at receiver devices and on the required performance level.

Optimal performance, for uniformly distributed information symbols, is obtained by applying a decoding algorithm based on Maximum Likelihood (ML) decoding criterion. An ML decoding algorithm compares the received signal with the possible transmitted symbols and decides in favor of the vector of information symbols that has the minimum Euclidean distance with respect to the received signal. ML decoders offer the minimum decoding error probability.

ML decoders can be implemented in various ways. Exhaustive search-based implementations require intensive processing and storage capabilities that may exceed the available ones. Alternative ML sequential decoding algorithms may be used to provide optimal performance while employing fewer computational and storage resources than the exhaustive search-based methods.

Sequential decoders are joint decoders based on a QR decomposition of the channel matrix and perform a tree search in a decoding tree to solve the ML decoding problem. The decoding tree comprises a plurality of nodes, levels, branches and paths. Nodes correspond to the different possible values of the information symbols.

Several ML sequential decoders exist and are generally divided into three families according to the tree-search strategy. Sequential decoders may be based on a depth-first strategy as disclosed for example in "E. Viterbo and J. Boutros. A universal lattice code decoder for fading channels. IEEE Transactions on Information Theory, 45(5):1639-1642, July 1999". A breadth-first tree-search strategy may be used as in the Stack decoder disclosed for example in "R. Fano. A heuristic discussion of probabilistic decoding. IEEE Transactions on Information Theory, 9(2):64-74, 1963". Other Sequential decoders may be based on a best-first strategy like the SB-Stack decoder as disclosed for example in the "G. R. Ben-Othman, R. Ouertani, and A. Salah. The spherical bound stack decoder. In Proceedings of International Conference on Wireless and Mobile Computing, pages 322-327, October 2008".

Sequential ML decoding algorithms offer optimal performance but require a high computational complexity that increases as a function of the size of the alphabet to which belong the information symbols and of the number of deployed antennas. The size of the constellation generally impacts the number of nodes to be visited at each level of the decoding tree. The number of deployed antennas generally impacts the number of levels in the decoding tree.

In a single-stream decoding algorithm, the various information symbols are decoded individually. Two different decoding strategies may be used: linear or non-linear. Using a linear decoding strategy, a linear decoding algorithm first creates inter-symbol interference-free data flows to decouple the different information symbols and then delivers an estimation of each symbol separately. Accordingly, the decision on a given information symbol is independent of the remaining estimated symbols. Interference elimination in the first step is realized through a projection of the channel output using a filtering matrix. Zero-Forcing (ZF) and Minimum Mean Squared Error (MMSE) decoders are examples of linear single-stream decoders. Alternatively, single-stream decoders can operate according to a non-linear decoding strategy, the information symbols being estimated individually. However, unlike linear decoding algorithms, the estimation of a given symbol is impacted by the previously estimated symbols with non-linear decoders. The Zero Forcing-Decision Feedback Equalizer (ZF-DFE) decoder is an example of a non-linear single-stream decoder. It is known as a Successive Interference Cancellation (SIC) scheme. It uses a QR decomposition of the channel matrix to recursively determine estimations of each single symbol from previously estimated symbols. Inter-symbol interference is then cancelled recursively, any decoding errors on a given symbol being propagated over the forthcoming estimations thereby inducing performance degradation. Linear and non-linear single-stream decoders require low decoding complexity but offer limited performance.

Using sub-block decoders, the vector of information symbols is divided into a plurality of sub-vectors and each sub-vector is decoded separately. The sub-vector division of the information symbols is performed in accordance with a sub-block division of a transmission channel representative matrix.

Certain sub-block decoders apply a combined ML and DFE decoding scheme for wireless MIMO systems using spatial multiplexing of data streams as disclosed in "Won-Joon Choi, R. Negi, and J. M. Cioffi. Combined ML and DFE decoding for the V-BLAST system. IEEE International Conference on Communications. Volume 3, pages 1243-1248, 2000." Accordingly, the vector of information symbols of a length n is divided into two sub-vectors of lengths p and n-p respectively. In a first phase, the sub-vector, comprising p information symbols, is estimated using an ML decoder. Using these estimated symbols, the receiver recursively performs an inter-symbol interference cancellation using a decision feedback equalization to determine an estimation of the remaining n-p symbols composing the second sub-vector of information symbols. Although such 2-block decoding schemes allow the achievement of better performance than ZF-DFE decoding, they are still sub-optimal.

Other sub-block decoding schemes have been proposed for Space-Time Coded MIMO systems using linear Space-Time Block Codes (STBC). Particular classes of low-complexity ML-decodable STBCs have been considered such as the family of multi-group decodable codes disclosed in "D. N. Dao, C. Yuen, C. Tellambura, Y. L. Guan, and T. T. Tjhung. Four-group decodable space-time block codes. IEEE Transactions on Signal Processing, 56(1):424-430, January 2008".

Other classes of low-complexity ML-decodable STBC comprise fast decodable codes as disclosed in "E. Biglieri, Y. Hong, and E. Viterbo. On fast-decodable space-time block codes. In IEEE International Zurich Seminar on Communications, 116-119, March 2008".

Still other classes of low-complexity ML-decodable STBC comprise fast-group decodable codes as disclosed in "T. P. Ren, Y. L. Guan, C. Yuen, and R. J. Shen. Fast-group-decodable space-time block code. In Proceedings of IEEE Information Theory Workshop, pages 1-5, January 2010".

Sub-block decoding in the presence of an STBC that belongs to one of these families of codes may be advantageously performed using a QR decomposition of the channel matrix. The zero structure of the equivalent channel matrix allows efficient recursive decoding of the various sub-vectors of information symbols with reduced complexity without sacrificing the decoding error performance. Particularly, some sub-vectors of symbols may be estimated in a separate way, in parallel, allowing faster and lower-complexity decoding.

The overall decoding complexity of a decoding process is determined from the computational complexity of the pre-processing and estimation phases. Preprocessing techniques may be used to improve the performance of sub-optimal decoding algorithms or to reduce the complexity of optimal sequential decoders. However, existing preprocessing techniques require a computational complexity that may impact the overall processing complexity. Further, such preprocessing methods may not be adapted to sub-block decoding algorithms. There is thus a need for designing low-complexity preprocessing methods adapted in particular to sub-block decoding schemes.

SUMMARY

In order to address these and other problems, there is provided a decoder for decoding a vector of information symbols received through a transmission channel in a communication system. The transmission channel is represented by a channel matrix composed of column vectors. The information symbols carrying a set of information bits. The decoder comprises:
- a transformation unit configured to determine a set of auxiliary channel matrices, each auxiliary channel matrix being determined by performing a linear combination of at least one of the column vectors of the channel matrix;
- a decomposition unit configured to determine a decomposition of each auxiliary channel matrix into an upper triangular matrix and an orthogonal matrix;
- a matrix selection unit configured to select at least one auxiliary channel matrix among the determined set of auxiliary channel matrices and its corresponding upper triangular matrix and orthogonal matrix depending on a selection criterion related to the components of the auxiliary upper triangular matrices.

The decoder is configured to determine an auxiliary signal by multiplying the transpose of the orthogonal matrix corresponding to the selected auxiliary channel matrix by the received signal. The decoder is configured to determine at least one estimate of the vector of information symbols from the auxiliary signal and the upper triangular matrix corresponding to the selected auxiliary channel matrix by applying a decoding algorithm.

In one embodiment, the transformation unit maybe configured to determine the set of auxiliary channel matrices by determining a set of transformation matrices. A transformation matrix comprises integer values and has a determinant equal to one or minus one. The set of auxiliary channel matrices being determined by multiplying the channel matrix by each matrix of the determined set of transformation matrices.

In one embodiment, the decomposition unit maybe configured to determine an upper triangular matrix and an orthogonal matrix from each auxiliary channel matrix by performing a QR decomposition of each determined auxiliary channel matrix.

In a particular embodiment, the matrix selection maybe further configured to divide each upper triangular matrix determined from each auxiliary channel matrix into a number of upper triangular sub-matrices and a number of rectangular sub-matrices depending on at least one sub-block decoding parameter. The sub-block decoding parameter may be chosen in a group consisting of a predefined number of sub-blocks, a set of sub-block lengths, and a predefined set of symbol estimation algorithms. In such embodiments, the selection criterion may depend on at least one selection metric related to the determined upper triangular sub-matrices and/or rectangular sub-matrices.

In one embodiment, the at least one selection metric may be a function of the number of components of the determined upper triangular sub-matrices and/or rectangular sub-matrices being greater than or equal to a metric threshold. The metric threshold is a real number.

In certain embodiments, the metric threshold may depend on the channel noise variance.

In other embodiments, the metric threshold may depend on at least one sub-block decoding parameter.

In an application to sub-block decoding, the decoder may be configured to divide the auxiliary signal into a number of sub-vectors in accordance with a division of the vector of information symbols into a number of sub-blocks depending on the predefined number of sub-blocks and the set of sub-block lengths. The decoder may be further configured to determine at least one estimate of each sub-vector of information symbols from the predefined number of sub-blocks by applying a symbol estimation algorithm from the predefined set of symbols estimation algorithms.

In one embodiment, a different symbol estimation algorithm may be applied for each sub-vector of information symbols. A symbol estimation algorithm may be selected in a group consisting of a sequential decoding algorithm, a ZF decoding algorithm, a ZF-DFE decoding algorithm and an MMSE decoding algorithm.

In certain embodiments, the decoder may be further configured to perform a lattice reduction and/or MMSE-GDFE preprocessing on the selected at least one transformed channel matrix.

In some embodiments, the decoder may be configured to determine a plurality of estimates of each sub-vector of information symbols for determining log-likelihood ratio values on the set of information bits.

There is also provided a receiver for receiving and decoding a vector of information symbols. The receiver comprises a decoder according to any preceding feature for decoding a vector of information symbols.

In one application of the invention in wireless multiple-input multiple-output communication systems, there is provided a wireless device capable of receiving data. The wireless device comprises a receiver for receiving and decoding a vector of information symbols according to any of the preceding embodiments.

In one application of the invention in optical multiple-input multiple output communication systems, there is provided an optical device capable of receiving data. The optical device comprises a receiver for receiving and decoding a vector of information symbols according to any of the preceding embodiments.

There is also provided a method of decoding a vector of information symbols received through a transmission channel in a communication system. The transmission channel being represented by a channel matrix comprising column vectors. The method comprising:
- determining a set of auxiliary channel matrices, each auxiliary channel matrix being determined by performing a linear combination of at least one of the column vectors of the channel matrix;

decomposing each auxiliary channel matrix into an upper triangular matrix and an orthogonal matrix;

selecting at least one auxiliary channel matrix among the determined set of auxiliary channel matrices and its corresponding upper triangular matrix and orthogonal matrix depending on a selection criterion related to the components of the auxiliary upper triangular matrices.

The method comprises determining an auxiliary signal by multiplying the transpose of the orthogonal matrix corresponding to the selected auxiliary channel matrix with the received signal. The method further comprises determining at least one estimate of the vector of information symbols from the auxiliary signal and the upper triangular matrix corresponding to the selected auxiliary channel matrix by applying a decoding algorithm.

In some embodiments, the method may comprise determining the set of auxiliary channel matrices by determining a set of transformation matrices. A transformation matrix comprising integer values and having a determinant equal to one (1) or minus one (−1). The set of auxiliary channel matrices being determined by multiplying the channel matrix by each matrix of the determined set of transformation matrices.

In some embodiments, the method may comprise determining an upper triangular matrix and an orthogonal matrix from each auxiliary channel matrix by performing a QR decomposition of each auxiliary channel matrix.

In some embodiments, the method may further comprise dividing each upper triangular matrix determined from each auxiliary channel matrix into a number of upper triangular sub-matrices and a number of rectangular sub-matrices depending on at least one sub-block decoding parameter. The at least one sub-block decoding parameter being chosen in a group consisting of a predefined number of sub-blocks, a set of sub-block lengths, and a predefined set of symbol estimation algorithms.

There is also provided a computer program product for decoding a vector of information symbols received through a transmission channel in a communication system. The transmission channel being represented by a channel matrix. The computer program product comprising:

a non-transitory computer readable storage medium, and instructions stored on the non-transitory computer readable storage medium that, when executed by a processor, cause the processor to:

determine a set of auxiliary channel matrices, each auxiliary channel matrix being determined by performing a linear combination of at least one of the column vectors of the channel matrix;

determine a decomposition of each auxiliary channel matrix into an upper triangular matrix and an orthogonal matrix;

select at least one auxiliary channel matrix among the determined set of auxiliary channel matrices and its corresponding upper triangular matrix and orthogonal matrix depending on a selection criterion related to the components of the auxiliary upper triangular matrices.

The processor maybe caused to determine an auxiliary signal by multiplying the transpose of the orthogonal matrix corresponding to the selected auxiliary channel matrix by the received signal. The processor may be further caused to determine at least one estimate of the vector of information symbols from the auxiliary signal and the upper triangular matrix corresponding to the selected auxiliary channel matrix by applying a decoding algorithm.

Advantageously, the various embodiments allow adapting the preprocessing phase of the decoding process to the implemented decoding algorithm for reducing the overall computational complexity.

In particular applications to QR-based decoding such as sequential ML decoding and recursive sub-block decoding schemes, various embodiments of the invention enable reducing the decoding errors while requiring a reasonable computational complexity.

Advantageously, in applications to recursive sub-block decoding algorithms, various embodiments of the invention allow transforming the channel matrix into a matrix with particular positions of zero entries enabling the reduction of error propagation and possibly the parallelization of the decoding of the different sub-vectors of information symbols.

Further advantages of the present invention will become clear to the skilled person upon examination of the drawings and the detailed description. It is intended that any additional advantages be incorporated herein.

BRIEF DESCRIPTION OF THE DRAWINGS

The accompanying drawings, which are incorporated in and constitute a part of this specification, illustrate various embodiments of the invention and, wherein.

DETAILED DESCRIPTION

Embodiments of the present invention provide, alone or in combination, methods, devices and computer program products for decoding a vector of information symbols received through a transmission channel in a communication system with an optimized computational complexity. The transmission channel is represented by a channel matrix comprising column vectors. Embodiments of the present invention are based on the transformation of the channel matrix into a matrix according to a selection criterion enabling the reduction of the complexity of the decoding algorithm implemented to determine at least one estimate of the vector of information symbols.

Methods, devices and computer program products according to various embodiments of the invention may be implemented in different types of systems. In particular, methods, devices and computer program products according to the various embodiments of the invention may be implemented in communication systems to determine an estimate of a vector of information symbols conveyed from one or many transmitter devices to a receiver device.

The following description of certain embodiments will be made with reference to communication systems, for illustration purpose only. However, the skilled person will readily understand that the various embodiments of the invention may be integrated in other types of systems such as signal processing systems.

Figure 1:
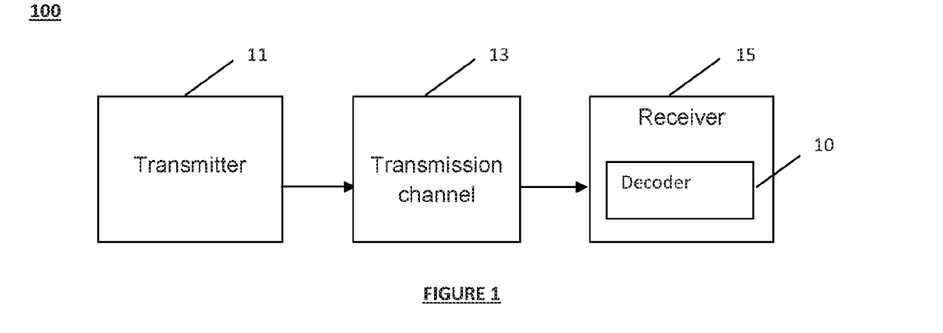
FIG. 1 illustrates a schematic diagram of an exemplary application of the invention to communication systems.

FIG. 1 illustrates an exemplary application of the invention in a communication system 100. The communication system 100 may be a wired, a wireless or an optical system. The communication system 100 may comprise at least one transmitter device 11 (hereinafter referred to as a "transmitter") configured to transmit a plurality of information symbols to at least one receiver device 15 (hereinafter referred to as "receiver") through a transmission channel 13. The receiver 15 may include at least one decoder 10 to decode the information symbols sent by one or more transmitter devices 11.

The transmitter devices 11 may be equipped with one or more transmit antennas and the receiver devices 15 may be equipped with one or more receive antennas. The transmission channel 13 may be any wired connection, wireless medium or optical fiber-based link.

The communication system 100 may be a wireless single-user MIMO system comprising a wireless multi-antenna transmitter device 11, configured to communicate a flow of information symbols representing an input data, and a wireless multi-antenna receiver device 15, configured to decode the conveyed symbols by the transmitter 11.

The communication system 100 may be a wireless multi-user MIMO system in which a plurality of wireless transmitter devices 11 and receiver devices 15 communicate with each other. In such embodiments, the communication system 100 may further use any multiple access technique such as TDMA, FDMA, CDMA, and SDMA.

The communication system 100 may be an optical fiber-based communication system. The received signal may accordingly correspond to the information symbols transmitted through the different polarization states of the optical fiber or propagating over the different modes of multi-mode fibers. In addition, a multiple access technique such as WDMA (Wavelength Division Multiple Access) may be used in such optical communication systems.

The transmission channel 13 may be any linear Additive White Gaussian Noise (AWGN) channel or a multipath channel using single-carrier or multi-carrier modulation formats such as OFDM or FBMC.

In an application to wireless single-user MIMO systems, the complexity of QR-based decoding of a received signal may be reduced without sacrificing error performance. Exemplary applications of the various decoding methods and devices include, with no limitation, MIMO decoding in configurations implementable in wireless standards such as the Wi-Fi (IEEE 802.11n), the cellular WiMax (IEEE 802.16e), the cooperative WiMax (IEEE 802.16j), the Long Term Evolution (LTE), the LTE-advanced, and the 5G ongoing standardization.

For illustration purposes only, the following description will be made with reference to a wireless single-user MIMO system accommodating a transmitter device 11 equipped with $n_t \geq 1$ transmit antennas and a receiver device 15 equipped with $n_r \geq 1$ receive antennas for decoding information symbols sent by the transmitter 11. However, the skilled person will readily understand that the various embodiments of the invention apply in other communication systems such as wireless multi-user MIMO systems and optical MIMO systems. Generally, the invention may be integrated in any communication system characterized by a linear representation (equivalently a lattice representation) of the channel output at receiver devices.

Figure 2:
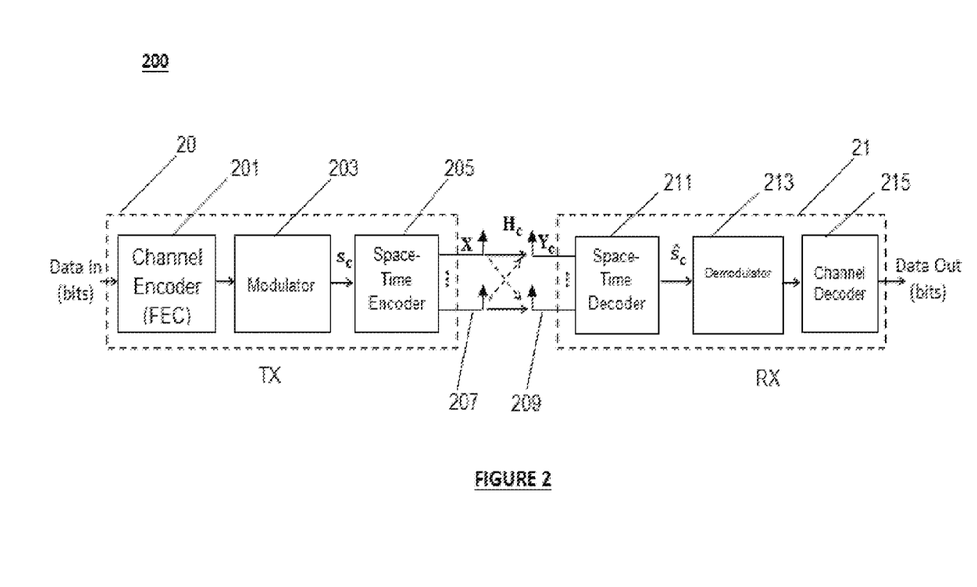
FIG. 2 illustrates a schematic diagram of an implementation of a Space-Time decoder in a wireless single-user MIMO system.

Referring to FIG. 2, there is illustrated an exemplary wireless communication system 200 in which embodiments of the present invention may be implemented. The MIMO system 200 may comprise a transmitter 20 implementing a Space Time Block Code (STBC) to distribute the symbols modulated over time and space dimensions. Each transmitter 20 of a station may exchange data with a receiver 21 of another station according to the wireless communication system 200.

The MIMO system may present a symmetric configuration. As used herein, a symmetric configuration refers to a configuration in which case the transmitter and the receiver are equipped with the same number of antennas $n_t = n_r$. Alternatively, the MIMO configuration may be asymmetric, in which case the number $n_r$ of receive antennas differs from the number $n_t$ of transmit antennas. In particular, in one embodiment, in order to avoid a rank deficiency problem, the number $n_r$ of receive antennas may be larger than the number $n_t$ of antennas at the transmitter.

The transmitter 20 can convey a signal to a receiver 21 over a noisy wireless MIMO channel. The transmitter 20 can be implemented in different devices or systems capable of operating in a wireless environment, such as for example in an equipment or a mobile station. The transmitter 20 may be fixed or mobile. It may comprise for example:

- a channel encoder 201 implementing a Forward Error Correction (FEC) code such as block codes or convolutional codes;
- a modulator 203 implementing a modulation scheme such as Quadrature Amplitude Modulation (QAM) delivering a modulated symbol vector $s_c$;
- a Space-Time encoder 205 for delivering a codeword matrix X;
- $n_t$ transmit antennas 207, each transmit antenna being associated with an OFDM or FBMC modulator.

The transmitter 20 may be configured to encode a received flow of information bits as data input using a FEC encoder 201 implementing for example a convolutional code. The encoded binary signal may be then modulated into a symbol vector $s_c$ using the modulator 203. Different modulation schemes may be implemented such as $2^q$-QAM or $2^q$-PSK with $2^q$ symbols or states. The modulated vector $s_c$ may be a complex-value vector comprising $\kappa$ complex-value symbols $S_1, s_2, \ldots, s_\kappa$ with q bits per symbol.

An information symbol $s_j$ has a mean power $E_s$, and can be written in the form:

$$s_j = Re(s_j) + iIm(s_j) \qquad (1)$$

In equation (1), i denotes the complex number such that $i^2 = -1$ and the Re(.) and Im(.) operators output respectively the real and imaginary parts of an input value.

When modulation formats such as $2^q$-QAM are used, the $2^q$ symbols or states represent a sub-set of the integer field $\mathbb{Z}[i]$. The corresponding constellation is composed of $2^q$ points representing the different states or symbols. In addition, in the case of squared modulations, the real and imaginary parts of the information symbols belong to the same finite alphabet $A = [-(q-1), (q-1)]$. The minimum distance $d_{min}$ of a modulation scheme, represents the Euclidean distance between two adjacent points in the constellation and is equal to 2 in such example.

A Space-Time Encoder 205 may be used to generate a codeword matrix X from the encoded symbols. The Space-Time encoder 205 may use a linear STBC of length T and may deliver a codeword matrix X of dimension $n_t \times T$ that belongs to a codebook C and is sent over T time slots. The coding rate of such codes is equal to $$\frac{\kappa}{T}$$

complex symbols per channel use, where $\kappa$ is the number of encoded complex-value symbols composing the vector $s_c = [s_1, s_2, \ldots, s\kappa]^t$ of dimension $\kappa$ in this case. When full rate codes are used, the Space-Time Encoder 205 encodes $\kappa = n_t T$ complex-value symbols. Examples of STBCs are the Perfect Codes. The Perfect codes provide full coding rates by encoding a number $\kappa = n_t^2$ ($T=n_t$) of complex information symbols and satisfy a non-vanishing determinant property.

The Space-Time Encoder 205 may use a spatial multiplexing scheme known as V-BLAST scheme by multiplexing the received complex-value information symbols over the different transmit antennas without performing a coding in the time dimension.

The codeword so constructed may be converted from the time domain to the frequency domain using a multicarrier modulation technique, using for example OFDM or FBMC modulators, and spread over the transmit antennas 207. Signals may be sent from the transmit antennas 207 optionally after filtering, frequency transposition and amplification.

The receiver 21 may be configured to receive and decode a signal communicated by the transmitter 20 in a wireless network through a transmission channel (also referred to as a "communication channel") subject to fading and interference and represented by a complex-value channel matrix $H_c$. In addition, the communication channel may be noisy, affected for example by a Gaussian Noise.

The receiver 21 may be integrated in a base station such as a Node-B in a cellular network, an access point in a local area network or ad-hoc networks or any other interfacing device operating in a wireless environment. The receiver 21 may be fixed or mobile. In one exemplary embodiment, the receiver 21 may comprise:

- a Space-Time decoder 211 configured to deliver, from the channel matrix $H_c$ and the channel output signal $Y_c$ an estimation $\hat{s}_c$ of the modulated symbol vector $s_c$;
- a demodulator 213 configured to generate a binary sequence by performing a demodulation of the estimated symbol vector $\hat{s}_c$;
- a channel decoder 215 configured to deliver as output a binary signal being the estimation of the transmitted bits using for example the Viterbi algorithm.

The receiver 21 implements a reverse processing of the processing performed in the transmitter 20. Accordingly, if a single-carrier modulation is used at the transmitter rather than a multi-carrier modulation, then the $n_r$ OFDM of FBMC demodulators may be replaced by corresponding single-carrier demodulators.

Figure 3:
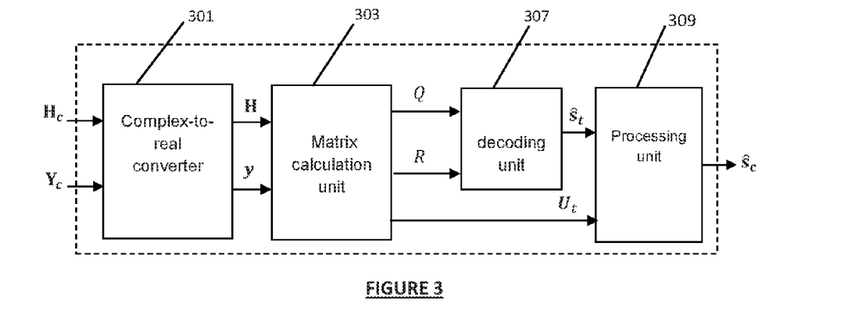
FIG. 3 is a block diagram representing the structure of a Space-Time decoder according to an exemplary embodiment of the invention.

Referring to FIG. 3, there is illustrated a structure of a Space-Time decoder 211 according to some embodiments. Accordingly, the Space-Time decoder 211 may comprise a complex-to-real converter 301 configured to convert the complex-value channel matrix $H_c$ into a real-value equivalent channel matrix H, and convert the complex-value channel output $Y_c$ into a real-value vector y of dimension n. The Space-Time decoder 211 may comprise a matrix calculation unit 303 configured to determine a set of auxiliary channel matrices from the channel matrix and select at least one auxiliary channel matrix among the determined set of auxiliary channel matrices according to a selection criterion. Each auxiliary channel matrix may be determined by performing a linear combination of at least one of the column vectors of the channel matrix. In accordance to the transformation of the channel matrix, the vector of information symbols in the real value representation maybe transformed into a vector $s_t$. The Space-Time decoder 211 may comprise a decoding unit 307 configured to determine an auxiliary signal from the received signal and the selected at least one auxiliary channel matrix and determine at least one estimate $\hat{s}_t$ of the transformed vector of information symbols by applying a decoding algorithm. The Space-Time decoder 211 may further comprise a processing unit 309 configured to deliver an estimate $\hat{s}_c$ of the vector of the complex-value information symbols using the transformation operation applied to transform the channel matrix by the matrix calculation unit 303 and a real-to-complex conversion to the vector $\hat{s}_t$. The conversion operation is the inverse of the processing performed at the complex-to-real converter 301.

Figure 4:
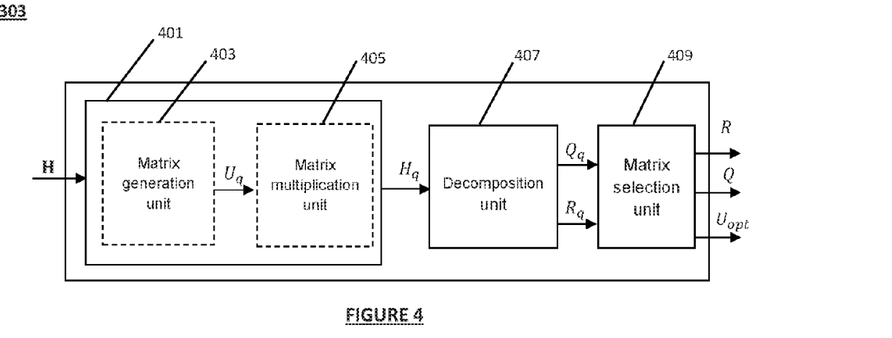
FIG. 4 is a block diagram illustrating the structure of a matrix calculation unit according to some embodiments of the invention.

Referring to FIG. 4, there is illustrated a structure of a matrix calculation unit 303 according to some embodiments of the invention in QR-based decoding. ML sequential decoding, ZF-DFE decoding and recursive sub-block decoding are examples of such embodiments. Accordingly, the matrix calculation unit 303 may comprise a transformation unit 401 comprising:

- a matrix generation unit 403 configured to determine a set $N_t$ of transformation matrices $U_q$. The number $N_t$ of the transformation matrices being an integer number comprised between two (2) and n, and
- a matrix multiplication unit 405 configured to determine a set of $N_t$ auxiliary channel matrices $H_q$ by multiplying the channel matrix (in a real value representation) by each transformation matrix $U_q$ according to $H_q = HU_q$.

The matrix calculation unit 303 may further comprise:

- a decomposition unit 407 configured to determine an upper triangular matrix $R_q$ and an orthogonal matrix $Q_q$ for each auxiliary channel matrix $H_q$ by performing a QR decomposition to the auxiliary channel matrices, and
- a matrix selection unit 409 configured to select at least one auxiliary channel matrix $H_t$ and its corresponding upper triangular matrix R and orthogonal matrix Q from the determined set of auxiliary channel matrices according to a selection criterion. Accordingly, the selected at least one auxiliary channel matrix may be written in the form $H_t = HU_t = QR$, with $U_t$ being the transformation matrix enabling to determine the selected auxiliary channel matrix. In accordance to the transformation of the channel matrix, the vector of information symbols in the real value representation may be transformed into the vector $s_t = U_t^{-1} s$.

In some embodiments, a transformation matrix $U_q$ may be a unimodular matrix, i.e. comprising integer values and having a determinant of unitary absolute value. In particular, transformation matrices $U_q$ may be permutation matrices of binary values corresponding to a permutation of the rows or the columns of the channel matrix.

Even if not limited to such applications, the invention has certain advantages in recursive sub-block decoding applications. The following description will be made with reference to an application to recursive sub-block decoding for illustration purpose only.

Figure 5:
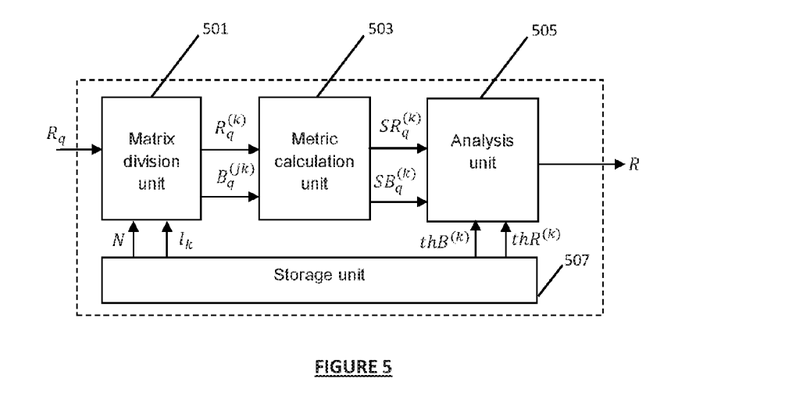
FIG. 5 is a block diagram illustrating the structure of a matrix selection unit according to some embodiments of the invention.

FIG. 5 is a block diagram representing a structure of the matrix selection unit 409 according to some embodiments of the invention in application to recursive sub-block decoding. Accordingly, the matrix selection unit 409 may comprise:
- a matrix division unit 501 configured to divide each upper triangular matrix $R_q$ into a plurality of upper triangular sub-matrices $R_q^{(k)}$ and a plurality of rectangular sub-matrices $B_q^{(jk)}$ given a set of sub-block decoding parameters. The set of sub-block decoding parameters may comprise at least a predefined number of sub-blocks N, a set of sub-block lengths $l_k$ for k=1, ..., N satisfying $\Sigma_{k=1}^{N} l_k = n$, and a set of symbol estimation algorithms $D^{(k)}$. Accordingly, an upper triangular matrix $R_q$ may be divided into $$N + \frac{N(N+1)}{2}$$

sub-matrices comprising N upper triangular sub-matrices $R_q^{(k)}$, k=1, ..., N and $$\frac{N(N+1)}{2}$$

rectangular sub-matrices $B_q^{(kj)}$, k=1, ..., N, j=k+1, ..., N;
- a metric calculation unit 503 configured to determine at least a metric related to the components of the divided upper triangular and/or rectangular sub-matrices. For sub-matrices corresponding to the upper triangular matrix $R_q$ of index q, q=1, ..., $N_t$ a metric related to the upper triangular sub-matrix $R_q^{(k)}$ of index k is denoted $SR_q^{(k)}$. A metric related to the rectangular sub-matrix $B_q^{(kj)}$ is denoted $BR_q^{(k)}$, and
- an analysis unit 505 configured to analyze the determined at least one metric delivered by the metric calculation unit 503 and determine at least one upper triangular matrix R and orthogonal matrix Q according to a selection criterion. In certain embodiments, the selection metric may be related to the metrics $SR_q^{(k)}$ and/or $SB_q^{(k)}$.

In some embodiments, the matrix selection unit 409 may comprise a storage unit 507 configured to store at least a set of predefined metric thresholds. In such embodiments, the analysis unit 505 may be further configured to determine at least one upper triangular matrix and one orthogonal matrix by comparing the determined metric by the metric calculation unit 503 with stored metric thresholds in the storage unit 507.

In certain embodiments, the number $N_t$ of the transformation matrices may be less than or equal to the number of sub-blocks N.

Figure 6:
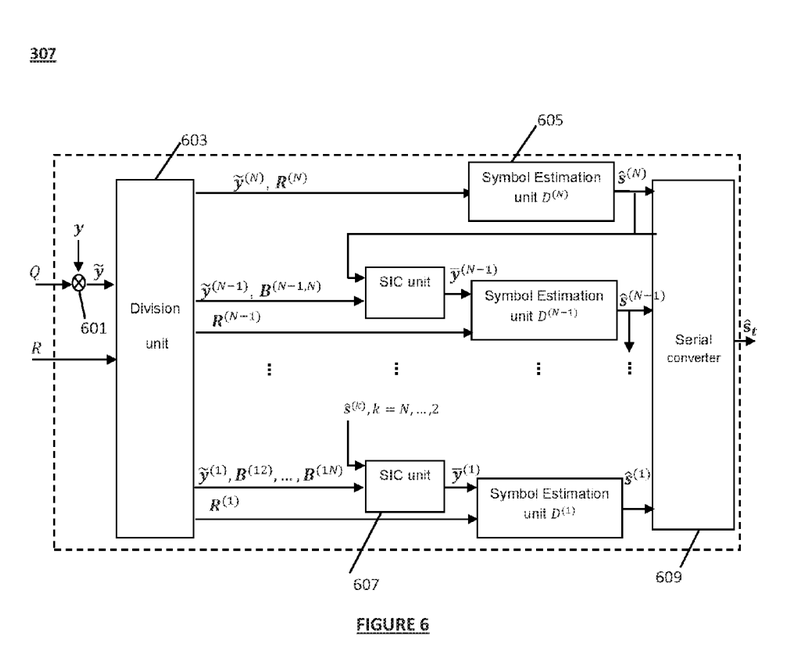
FIG. 6 is a block diagram representing the decoding unit according to some embodiments of the invention.

FIG. 6 illustrates a structure of the decoding unit 307 according to some embodiments in application to recursive sub-block decoding. As illustrated in FIG. 6, the decoding unit 307 may comprise a multiplication unit 601 configured to determine an auxiliary signal ỹ by scaling the real-value signal y by the transpose of the matrix Q obtained from the QR decomposition of the selected auxiliary channel matrix. The decoding unit 307 may further comprise a division unit 603 configured to:
- divide the vectors $s_r$ and $Q^t y$ into sub-vectors $s^{(k)}$ and $ỹ^{(k)}$ respectively, for k=1, ..., N, where a sub-vector of index k has a length $l_k$, and
- retrieve the upper triangular sub-matrices $R^{(k)}$ and rectangular sub-matrices $B^{(kj)}$, k=1, ..., N, j=k+1, ..., N of the selected upper triangular matrix R.

These divided sub-matrices may have been previously stored in the storage unit 507.

Using the sub-vectors $s^{(k)}$ and $ỹ^{(k)}$ and the divided sub-matrices $R^{(k)}$ and $B^{(kj)}$, a set of sub-blocks $(SB)_k$ may be defined. For each index k=1, ..., N–1, a sub-block $(SB)_k$ may be defined as $(SB)_k = \{l_k, s^{(k)}, R^{(k)}, ỹ^{(k)}, w̃^{(k)}, D^{(k)}, B^{(kj)}, j=k+1, ..., N\}$. For k=N, the corresponding sub-block is given by $(SB)_N = \{l_N, s^{(N)}, R^{(N)}, ỹ^{(N)}, w̃^{(N)}, D^{(N)}\}$.

The decoding unit 307 may further comprise N symbol estimation units 605 and N–1 successive interference cancellation units 607. A SIC unit 607 may be associated with a sub-block $(SB)_k$ and configured to calculate a vector $ȳ^{(k)}$. A symbol estimation unit 605 may be associated with each sub-block $(SB)_k$ to determine an estimate $ŝ^{(k)}$ using a symbol estimation algorithm $D^{(k)}$. The decoding unit 307 may further comprise a serial converter 609 configured to determine the real-value vector $ŝ_r = [ŝ^{(1)}, ŝ^{(2)}, ..., ŝ^{(N)}]^t$ by aggregating the outputs of the N symbol estimation units.

The skilled person will readily understand that the invention is not limited to the use of an estimation unit 605 for each sub-block. Alternatively a unique symbol estimation unit 605 or a set of symbol estimation units 605 (the set comprising less units than the total number of sub-blocks) may be used to determine the estimate of each sub-vector. In addition, in applications to semi-exhaustive recursive sub-block decoding, an estimation unit 605 may be configured to determine two or more estimates of the corresponding sub-vector of information symbols. Moreover, in one application for example to exhaustive recursive sub-block decoding, an estimation unit 605 may be configured to generate all possible estimate values of the sub-vector of information symbols.

In an application to a wireless Rayleigh fading multiple antenna system (single-user MIMO) for decoding a signal sent from a transmitter equipped with $n_t$ transmit antennas using a spatial multiplexing scheme and $2^q$-QAM modulation, to a receiver equipped with $n_r$ receive antennas with $n_r \geq n_t$, the received complex-value signal may be written in the form:

$$y_c = H_c s_c + w_c \quad (2)$$

In equation (2), $y_c$ is a $n_r$-dimensional vector, $s_c$ denotes the complex-value vector of transmitted information symbols of dimension $n_t$. The complex-value $n_r \times n_t$ matrix $H_c$ represents the channel matrix comprising the fading gains. In a Rayleigh fading channel, the entries of the channel matrix $H_c$ are of independent identically distributed (i.i.d) complex Gaussian type. The channel matrix may be estimated in coherent transmissions at the receiver using estimation techniques such as least square estimators. In addition to the multipath fading effects, the transmission channel may be noisy. The noise may result from the thermal noise of the system components, inter-user interference and intercepted interfering radiation by antennas. The total noise may be modeled by a zero-mean Additive White Gaussian Noise of variance $\sigma^2$ per real-value dimension modeled in equation (2) by the $n_r$-dimensional complex-value vector $w_c$.

Given the channel output, the receiver may attempt to generate an estimate of the original vector of information symbols.

Figure 7:
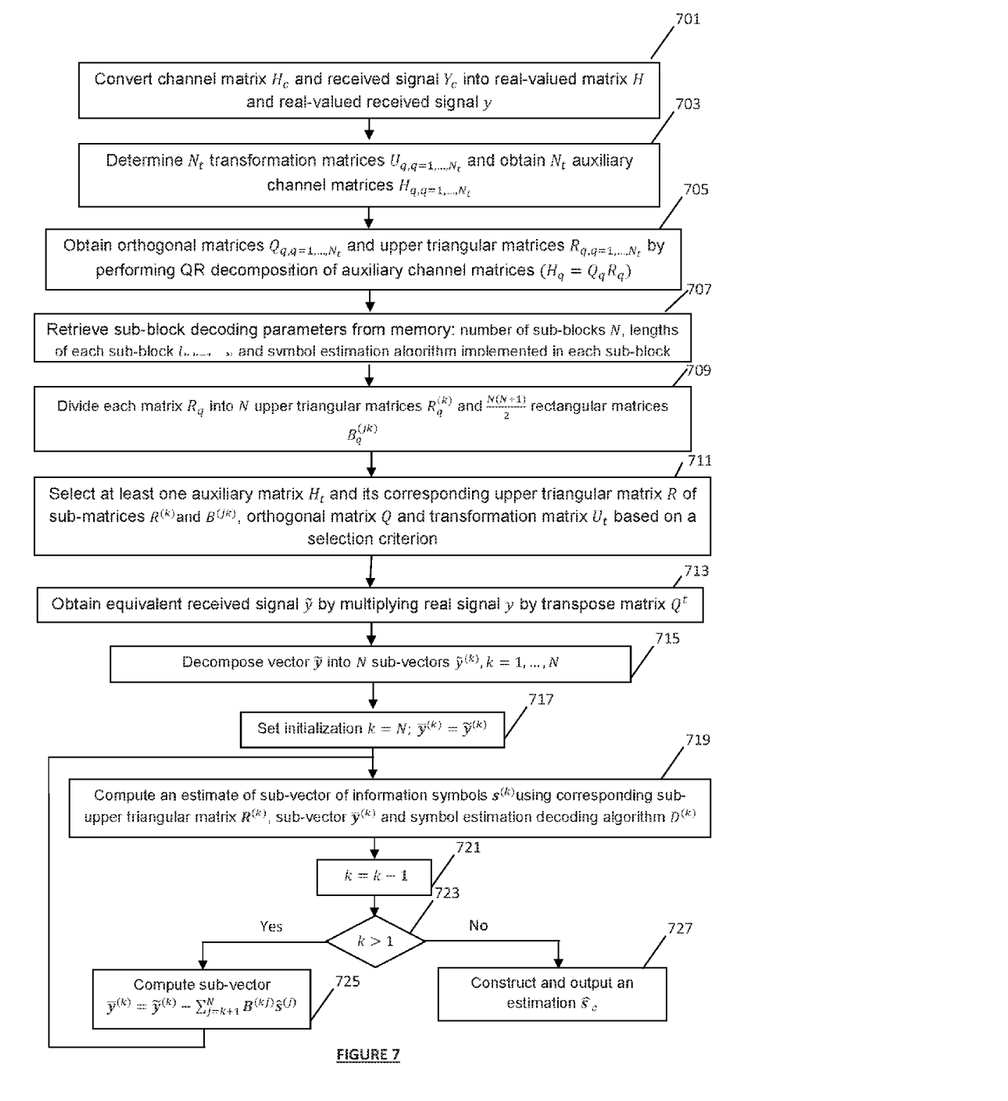
FIG. 7 is a flowchart depicting a method of recursive sub-block decoding according to an exemplary embodiment of the invention.

FIG. 7 is a flowchart depicting the decoding method according to some embodiments and according to a recursive sub-block decoding application.

In step 701, a complex-to-real conversion may be performed to determine a real-value form of the received signal.

For example, in one embodiment using a spatial multiplexing scheme, the system in equation (2) may be transformed into:

$$y = \begin{bmatrix} Re(y_c) \\ Im(y_c) \end{bmatrix} = \begin{bmatrix} Re(H_c) & -Im(H_c) \\ Im(H_c) & Re(H_c) \end{bmatrix} \begin{bmatrix} Re(s_c) \\ Im(s_c) \end{bmatrix} + \begin{bmatrix} Re(w_c) \\ Im(w_c) \end{bmatrix} \quad (3)$$

The Re(.) and Im(.) operators in equation (3) designate the real and imaginary parts of each element composing the underlying vector or matrix.

Equation (3) can be written in the form:

$$y = Hs + w \quad (4)$$

To facilitate the understanding of the following embodiments, the following description will be made with reference to a spatial multiplexing scheme and involving a symmetric MIMO configuration where the transmitter and receiver are equipped with the same number of antennas $n_t = n_r$, for illustration purposes only. Accordingly, the real-value vectors y, s and w in equation (4) will be represented as n-dimensional vectors with $n = 2n_t = 2n_r$, and the equivalent real-value channel matrix H will be represented by a square n×n matrix. The vector s comprises the real and imaginary parts of the original complex information symbols composing the vector $s_c$.

In step 703, a set of $N_t$ transformation matrices $U_q$, $q=1, \ldots, N_t$ may be determined. The number of the transformation matrices may be comprised between two (2) and n. A transformation matrix $U_q$ is a square matrix of dimension n×n. It may be any unimodular matrix comprising integer values and having a determinant of an absolute value equal to one. It may correspond to one or any combination of elementary column operations comprising:

- interchanging (or permuting) two or more columns;
- adding a multiple of one column to another;
- multiplying any column by a non-zero value.

In embodiments where transformation matrices are designed to permute (or interchange) the columns of the channel matrix in its real-value representation, the determined transformation matrices correspond to permutation matrices. A permutation matrix is an orthogonal matrix comprising binary values. A permutation matrix may be associated with an ordering $\pi_q$ of the columns of the matrix H. By writing the real-value form of the channel matrix in the form $H = (h_1 \ldots h_n)$ where vectors $h_{i,i=1,\ldots,n}$ represent the columns of H, an ordering $\pi_q$ can be represented in the form $$\pi_q = \begin{pmatrix} h_1 & \ldots & h_n \\ \pi_q(h_1) & \ldots & \pi_q(h_n) \end{pmatrix}.$$

A column vector $h_i$ of index i is accordingly permuted to the vector $\pi_q(h_i)$. The permutation matrix $U_q$ corresponding to the ordering $\pi_q$ is a matrix with all zero entries except that in row i, the entry of the index corresponding to $\pi_q(h_i)$ is equal to 1. The corresponding auxiliary (permuted in this case) channel matrix is accordingly given by $H_q = (\pi_q(h_1), \ldots, \pi_q(h_n))$.

In other embodiments, a transformation matrix may correspond to a reduction of the column vectors of the channel matrix. Any lattice reduction algorithm may be implemented to determine at least one transformation matrix in this case.

The determined $N_t$ transformation matrices $U_q$ may be used to compute $N_t$ auxiliary channel matrices $H_q$ for $q=1, \ldots, N_t$ by multiplying the real value channel matrix H by each matrix of the determined set of transformation matrices according to $H_q = HU_q$.

In step 705, a plurality of upper triangular matrices $R_q \in \mathbb{R}^{n \times n}$ and orthogonal matrices $Q_q \in \mathbb{R}^{n \times n}$ may be determined by performing a QR decomposition of each auxiliary channel matrix such that $H_q = Q_q R_q$.

In application to recursive sub-block decoding, a set of predefined sub-block decoding parameters comprising at least one sub-block decoding parameter may be initially received or retrieved from memory in step 707. The sub-block decoding parameters may comprise a predefined number of sub-blocks N (preferably equal to at least two), a set of sub-block lengths $l_{k,k=1,\ldots,N}$ satisfying $\Sigma_{k=1}^{N} l_k = n$, and a set of symbol estimation algorithms $D^{(k),k=1,\ldots,N}$. The lengths $l_{k,k=1,\ldots,N}$ may be equal or different. The symbol estimation algorithms may be similar or distinct. The following description will be made with reference to sub-block decoding parameters comprising these three types of parameters (N, $l_{k,k=1,\ldots,N}$, $D^{(k),k=1,\ldots,N}$).

Using the sub-block decoding parameters, a division of the upper triangular matrices $R_q$ for $q=1, \ldots, N_t$ may be performed in step 709. Accordingly, a matrix $R_q$ may be divided into $$N + \frac{N(N+1)}{2}$$

sub-matrices comprising N upper triangular sub-matrices $R_q^{(k)}$, $k=1, \ldots, N$ and $$\frac{N(N+1)}{2}$$

rectangular sub-matrices $B_q^{(kj)}$, $k=1, \ldots, N$, $j=k+1, \ldots, N$ such that:

$$R_q = \begin{bmatrix} R_q^{(1)} & \ldots & B_q^{(1,N-1)} & B_q^{(1N)} \\ 0 & \ldots & \vdots & \vdots \\ 0 & 0 & R_q^{(N-1)} & B_q^{(N-1,N)} \\ 0 & 0 & 0 & R_q^{(N)} \end{bmatrix} \quad (5)$$

A divided upper triangular sub-matrix $R_q^{(k)}$, $k=1, \ldots, N$ designates a square matrix of dimension $l_k \times l_k$.

A divided sub-matrix $B_q^{(kj)}$, $k=1, \ldots, N$; $j=k+1, \ldots, N$ designates a rectangular matrix of dimension $l_k \times l_j$.

In step 711, at least one auxiliary channel matrix $H_t$ and its corresponding upper triangular matrix R of sub-matrices $R^{(k)}$ and $B^{(jk)}$, orthogonal matrix Q and transformation matrix $U_t$ may be selected according to a selection criterion.

In some embodiments, the selection criterion may depend on at least one selection metric related to the divided upper triangular sub-matrices $R_q^{(k)}$ and/or divided rectangular sub-matrices $B_q^{(jk)}$. In particular, the selection criterion may correspond to the maximization or the minimization of one or more selection metrics related to the components of the divided upper triangular and/or rectangular sub-matrices.

Accordingly, a metric $SR_q^{(k)}$ and a metric $SB_q^{(k)}$ related respectively to an upper triangular sub-matrix $R_q^{(k)}$ and a rectangular sub-matrix $B_q^{(kj)}$ may be calculated.

In some embodiments in application to QR-based Space-Time decoding, a metric $SB_q^{(k)}$ related to the divided rectangular sub-matrices may correspond to the number of zero components of the corresponding rectangular sub-matrices $B_q^{(kj)}$. In such embodiments, the transformation of the channel matrix may aim at obtaining an upper triangular matrix with the maximum number of zero components or obtaining an upper triangular matrix with zero components located in specific positions enabling for better decoding error performance/complexity tradeoffs.

A matrix with a number of zero components higher than the number of non-zero components is known as a sparse matrix. In contrast, a dense matrix is a matrix that has a number of non-zero entries larger than the number of zero components.

A zero entry in the upper triangular matrix used in the decoding process indicates an independence between two information symbols in the vector of the information symbols to be decoded. Accordingly, in certain embodiments of the invention applied to QR-based Space-Time decoding, considering a sparse upper triangular matrix R in the decoding process may advantageously enable for reducing the number of required computations of the ML metric using any type of joint, single-stream or sub-block decoding scheme.

In addition to the computational complexity advantage, sparse upper triangular matrices with zero entries located for example in the rectangular sub-matrices may further provide a performance improvement advantage.

For example, when applied to ZF-DFE decoding, transforming the channel matrix such that the selected upper triangular matrix R to be used in the decoding process has zero entries positioned within the rectangular sub-matrices enables the reduction of the error propagation induced by the inter-symbol interference.

In another example of application to recursive sub-block decoding, the transformation of the channel matrix may advantageously enable the parallelization of the decoding of the different sub-vectors of information symbols in the transformed vector of information symbols.

Still in another application to sequential decoding, transforming the channel matrix such that the resulting upper triangular matrix used in the resolution of the ML metric has zero entries in specific positions may advantageously enable searching for the ML solution in the decoding tree by visiting some paths or tree levels independently in a parallel way. As a result, computational complexity and processing time may be significantly decreased.

In one embodiment, a first metric (hereinafter referred to as 'hard sparsity metric) related to the components of the rectangular sub-matrices may be used. It indicates, for a given divided rectangular sub-matrix $B_q^{(jk)}$ of index k, the number of zero entries. The selection criterion may correspond in such embodiments to the maximization of the hard sparsity metrics per divided sub-blocks. The selected transformation matrix over all generated transformation matrices may correspond to the transformation matrix that enables to obtain an upper triangular matrix R with the maximum hard sparsity metrics for the $$\frac{N(N+1)}{2}$$

divided rectangular sub-matrices.

In another embodiment, a second metric (hereinafter referred to as 'weighted sparsity metric') related to the components of the rectangular sub-matrices may be used. It indicates the number and the positions of the zero entries in the upper triangular matrix. A weighted sparsity metric of a rectangular sub-matrix $B_q^{(jk)}$ of index k may be any function of the components of the corresponding sub-matrix $B_q^{(jk)}$ weighted by their position in the upper triangular matrix $R_q$. Positions of the components may be defined by a pair of row and column indexes.

In some embodiments, the matrix selection unit 409 may comprise a storage unit 507 configured to store at least a set of predefined metric thresholds. In such embodiments, the analysis unit 505 may be further configured to select at least one auxiliary channel matrix and its corresponding upper triangular matrix and orthogonal matrix by comparing the determined metrics by the metric calculation unit 503 with stored metric thresholds in the storage unit 507. In such embodiments, a third metric (referred to hereinafter as 'soft sparsity metric') related to the components of the rectangular sub-matrices may be used. It indicates the number of values in the divided rectangular sub-matrices that are greater than or equal to the predefined metric thresholds. Accordingly, the selection criterion may correspond to the maximum number of entries per rectangular sub-matrix that are greater than or equal to the predefined threshold metrics. The selected transformation matrix over all generated transformation matrices may correspond to the one that enables to obtain a matrix R with the maximum soft sparsity metrics in the divided rectangular sub-matrices.

Using such thresholds, some or the totality of the information symbols may be decoded separately in a parallel way although their corresponding fading coefficients in the upper triangular matrix used in the decoding process are not equal to zero.

The threshold metrics may be the same for all the sub-blocks or may depend on the position of the sub-block within the upper triangular matrix. For sub-blocks associated to the group of information symbols located in more advanced levels in the decoding tree with respect to the nodes located in the last level of the tree (also referred to hereinafter as 'leaf nodes'), i.e. near to the positions of the leaf nodes, a higher metric threshold may be considered. It may advantageously enable decoupling information symbols and accelerating the convergence of the decoding process.

In addition to the performance improvement advantage, in certain embodiments using hardware implementations, the required storage, calculation and processing resources may be considerably reduced given that specific algorithms and data structures may be deployed to store and manipulate sparse matrices taking advantage of the sparse structure of the underlying matrix.

In step 713, an equivalent system to equation (4) may be determined using the selected auxiliary channel matrix. Accordingly, equation (4) may be first rewritten as:

$$y=HU_tU_t^{-1}s+w=H_ts_t+w=QRs_t+w \qquad (6)$$

In equation (6), $s_t=U_t^{-1}s$ designates an integer value vector and corresponds to a transformed copy of the real-value vector of information symbols s associated with the transformation of the channel matrix using the selected transformation matrix $U_t$. Given the orthogonality of the matrix Q, an equivalent system to equation (6) may be determined according to:

$$\tilde{y}=Q^t y=Rs_t+\tilde{w} \quad (7)$$

In equation (7), $\tilde{w}=Q^t w$ designates a scaled noise vector.

In application to QR-based decoding, the real-value equivalent system of equation (7) is considered for the estimation of the originally transmitted information symbols.

The ML decoding problem for jointly decoding the information symbols is given by:

$$\hat{s}_{t,ML}=\text{argmin}_{s_t \in T^n}\|\tilde{y}-Rs_t\|^2 \quad (8)$$

In equation (8), T designates the alphabet to which belong the components of the transformed vector $s_t$. The alphabet T may be determined, in certain embodiments, from the alphabet $A=[c_{min}, c_{max}]$ to which belong the real and imaginary parts of the complex-value vector $s_c$ composing the real vector s.

An ML metric maybe defined as:

$$m(s)=\|\tilde{y}-Rs_t\|^2 \quad (9)$$

In one application to recursive sub-block decoding, a sub-block decoding may be performed to recover an estimation of the original information symbols. Accordingly, in step 715, a division of the vector $\tilde{y}$ into N sub-vectors may be performed such that $$\tilde{y} = \begin{bmatrix} \tilde{y}^{(1)} \\ \vdots \\ \tilde{y}^{(N)} \end{bmatrix}.$$

A sub-vector $\tilde{y}^{(k)}$ of index k, for k=1, ..., N has a lengths $l_k$. The same sub-vector division may be applied to the noise vector $\tilde{w}$ to determine N sub-vectors $\tilde{w}^{(k)}$ of lengths $l_k$ such that $$\tilde{w} = \begin{bmatrix} \tilde{w}^{(1)} \\ \vdots \\ \tilde{w}^{(N)} \end{bmatrix}.$$

The sub-block decoding parameters, divided sub-matrices $R^{(k)}$ and $B^{(kj)}$ of the selected upper triangular matrix R and the divided sub-vectors $\tilde{y}^{(k)}$ may be grouped into sub-blocks $(SB)_k$, k=1, ..., N. A sub-block $(SB)_k$, for k=1, ..., N-1, may be defined by a set of parameters such that $(SB)_k=\{l_k, s^{(k)}, R^{(k)}, \tilde{y}^{(k)}, \tilde{w}^{(k)}, D^{(k)}, B^{(kj)}, j=k+1, ..., N\}$, where:

$$\tilde{y}^{(k)}=R^{(k)}s^{(k)}\Sigma_{j=k+1}^{N}B^{(kj)}s^{(j)}+\tilde{w}^{(k)} \quad (10)$$

For k=N, the sub-block may be defined by $(SB)_N=\{l_N, s^{(N)}, R^{(N)}, \tilde{y}^{(N)}, \tilde{w}^{(N)}, D^{(N)}\}$ such that:

$$\tilde{y}^{(N)}=R^{(N)}s^{(N)}+\tilde{w}^{(N)} \quad (11)$$

Systems in equations (10) and (11) may be used for the decoding of the various sub-vectors of information symbols.

According to such groups of sub-blocks, the ML decoding metric in equation (9) may be written as:

$$m(s)=\|\tilde{y}-Rs_t\|^2=\|\Sigma_{k=1}^{N}\tilde{y}^{(k)}-(R^{(k)}s^{(k)}+\Sigma_{j=k+1}^{N}B^{(kj)}s^{(j)})\|^2 \quad (12)$$

Accordingly, a sub-block estimation of the original sub-vectors of symbols $s^{(k)}$, k=N, N-1, ..., 1 may be performed recursively in step 719. An initialization may be performed in step 717 corresponding to k=N.

Step 719 may be repeated for each sub-block $(SB)_k$, k=N, N-1, ... 1 to determine a sub-vector estimation $\hat{s}^{(k)}$ of the sub-vector of symbols $s^{(k)}$ of the transformed vector $s_t$. For each k=N-1, ..., 1, a sub-vector $\overline{y}^{(k)}=\tilde{y}^{(k)}-\Sigma_{j=k+1}^{N}B^{(kj)}\hat{s}^{(j)}$ may be computed in step 725 from the previously estimated sub-vectors $\hat{s}^{(j)}$ and the rectangular sub-matrices $B^{(kj)}$, j=k+1, ..., N. An estimate of the sub-vector of index k may be determined using the symbol estimation algorithm $D^{(k)}$, the upper triangular matrix $R^{(k)}$, and the calculated sub-vector $\overline{y}^{(k)}$. For k=N, the estimate $\hat{s}^{(N)}$ may be determined using the corresponding symbol estimation algorithm $D^{(N)}$, the corresponding upper triangular sub-matrix $R^{(N)}$ and the vector $\overline{y}^{(N)}=\tilde{y}^{(N)}$ initialized in step 717.

If it is determined that all the sub-vectors of symbols have been estimated in step 723, step 727 may be performed to construct an output, from the sub-vectors $\hat{s}^{(k)}$, k=1, ..., N, as an estimation $\hat{s}_c$ of the complex-value vector of information symbols $s_c$. The construction step may comprise three phases. First, a real-value vector $\hat{s}_t=[\hat{s}^{(1)}, ..., \hat{s}^{(N)}]^t$ may be constructed by aggregating the different sub-vector estimates. Then, an estimate $\hat{s}$ of the vector of information symbols s may be determined by transforming the vector $\hat{s}_t$ using the selected transformation matrix according to $\hat{s}=U_t\hat{s}_t$. Finally, the obtained vector $\hat{s}$ may be converted into the complex-value vector $\hat{s}_c=[\hat{s}_1, \hat{s}_2, ..., \hat{s}_{n/2}]^t$ such that a component $\hat{s}_j$ for j=1, ..., n/2 is given by:

$$\hat{s}_j=(\hat{s})_j+i(\hat{s})_{j+n/2} \quad (13)$$

In equation (13), $(u)_j$ denotes the $j^{th}$ element of a vector u.

According to certain embodiments of the invention, the symbol estimation algorithms $D^{(k)}$, implemented in step 719 for k=1, ..., N may be similar or different. A symbol estimation algorithm $D^{(k)}$ maybe, but not limited to, any sequential decoding scheme, a ZF, an MMSE or ZF-DFE.

In one embodiment where a sequential decoder is used in a given sub-block $(SB)_k$, the corresponding decoder $D^{(k)}$ delivers an estimate $\hat{s}^{(k)}$ by minimizing the sub-block metric $m(s^{(k)})=\|\overline{y}^{(k)}-R^{(k)}s^{(k)}\|^2$ according to:

$$\hat{s}^{(k)} = \text{argmin}_{s^{(k)} \in T^{l_k}} m(s^{(k)}) = \text{argmin}_{s^{(k)} \in T^{l_k}} \|\overline{y}^{(k)} - R^{(k)}s^{(k)}\|^2 \quad (14)$$

Sequential tree-search algorithms such as the Sphere Decoder (SD), the Stack decoder and the SB-Stack decoder (SB-Stack), may be used to solve equation (14).

Further, in certain embodiments, a preprocessing on the upper triangular sub-matrices $R^{(k)}$ prior to decoding may be performed using for example a lattice reduction and/or an MMSE-GDFE filtering. Preprocessing methods may be also applied to the channel matrix prior to sub-block division and decoding.

Although the various embodiments have been detailed in the case of MIMO systems using spatial multiplexing of information symbols, it should be noted that the invention is also applicable in configurations using linear Space-Time Block codes. In the presence of a Space-Time Block code of length T and encoding κ symbols, the real-value expression of the channel output can be written in the linear representation form of equation (4) where the equivalent channel matrix is the real-value $2n_rT \times 2\kappa$ matrix $H_{eq}$ given by:

$$H_{eq}=(I_T \otimes H)G \quad (15)$$

The $2n_rT \times 2\kappa$ matrix G designates a real-value matrix known as a generator matrix or coding matrix of the linear Space-Time Block code. $I_T$ denotes the identity matrix of dimension T and the operator ⊗ is the Kronecker matrices product.

Furthermore, while the various embodiments of the invention were detailed for symmetric MIMO configurations characterized by a same number of transmit and receive antennas, it should be noted that the invention may also be applied in asymmetric MIMO configurations with $n_t < n_r$. A linear representation in the form of equation (4) can also be obtained by performing the complex-to-real conversion of step 701 to the equivalent system given by:

$$U^\dagger y_c = D V^\dagger s_c + U^\dagger w_c \qquad (16)$$

In equation (16), the matrices U and V are unitary matrices obtained, together with matrix D, from the singular value decomposition of the matrix $H_c = UDV^t$. D is a diagonal matrix having positive diagonal entries representing the singular values of the matrix $H_c$. The superscript $(.)^\dagger$ designates the Hermitian transposition operator.

Further, the various embodiments of the invention are not limited to particular types of recursive sub-block decoding, and apply to any other types of sub-block decoding such as Semi-exhaustive Recursive Sub-Block decoding disclosed in the patent application EP N° 15306808.5. Further, the various embodiments of the invention apply both to hard and soft decoding.

In one application to soft-output decoding, methods and devices according to the various embodiments allow generating a list of estimates of the original vector of information symbols. The list thus obtained can be used to calculate the log likelihood ratio values for approximating the extrinsic information of the different information bits carried by the original information symbols. Several iterations of steps 719 to 727 may be performed in order to fill the list of estimates.

The methods and devices described herein may be implemented by various means. For example, these techniques may be implemented in hardware, software, or a combination thereof. For a hardware implementation, the processing elements of a Space-Time decoder 211 can be implemented for example according to a hardware-only configuration (for example, in one or more FPGA, ASIC or VLSI integrated circuits with the corresponding memory) or according to a configuration using both VLSI and DSP.

Figure 8:
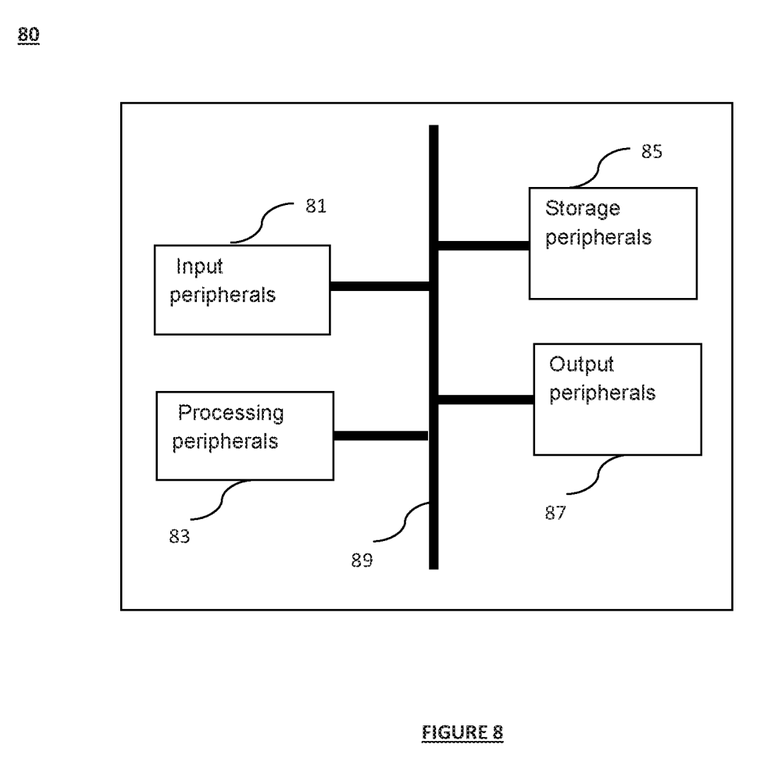
FIG. 8 illustrates a hardware architecture of a Space-Time decoder according to some embodiments of the invention.

FIG. 8 represents an exemplary hardware architecture 80 of the Space-Time decoder 211 according to certain embodiments of the invention. The hardware architecture 80 may be implemented in a machine or computer executed device. As illustrated, the Space-Time decoder 211 may include various computing, storage and communication units possibly interacting with one another through a data and address port 89 and comprising:

Input peripherals 81 for receiving for example input data from the receive antennas 209;

Processing peripherals 83 comprising one or more microprocessors (CPU) such as an FPGA or an ASIC configured for example to execute the corresponding instructions to run the methods and algorithms according to the various embodiments of the invention;

Storage peripherals 85 possibly comprising a random access memory (RAM) or a read-only memory to store for example the sub-block decoding parameters and the set of transformation matrices and auxiliary channel matrices computed prior to decoding;

Output peripherals 87 comprising communication means such as displays enabling for example man-to-machine interaction between the receiver device 21 and a MIMO system administrator for configuration and maintenance purposes.

Further, while some embodiments of the invention have been described in relation to a wireless single-user MIMO system, it should be noted that the invention is not limited to such an application. The invention may be integrated in any receiver device operating in any linear communication system characterized by a linear representation of the channel output. The communication system may be wired, wireless or optical fiber-based accommodating single or multiple users, using single or multiple antennas, and single or multi-carrier communication techniques. For example, the present invention may be integrated in a receiver device implemented in a wireless distributed MIMO system. Distributed MIMO may be used for example in cellular communications applied in 3G, 4G, LTE, and future 5G standard. Cooperative communications applied for example in ad-hoc networks (wireless sensor networks, machine-to-machine communications, internet of things, etc) are also examples of distributed MIMO systems. In addition to wireless networks, the present invention may be integrated in optical receiver devices implemented in optical fiber-based communication systems such as Polarization Division Multiplexing-OFDM (PDM-OFDM) systems.

Further, the invention is not limited to communication devices and may be integrated in signal processing devices such as electronic filters of finite impulse response (FIR) used in audio applications like audio crossovers and audio mastering. Accordingly, some embodiments may be used to determine an estimate of an input sequence, given an output sequence of a FIR filter of order M.

In another application, methods, devices and computer program products according to some embodiments of the invention may be implemented in a Global Navigation Satellite System (GNSS), such as IRNSS, Beidou, GLONASS, Galileo; GPS comprising for instance at least a GPS receiver for estimating positioning parameters using for example carrier phase measurements.

Further, methods, devices and computer program products according to some embodiments of the invention may be implemented in cryptographic systems for determining estimates on private secret values used in a cryptographic algorithm for encrypting/decrypting data or messages during their storage, processing or communication. In lattice-based cryptography applications, data/messages are encrypted in the form of lattice points. The decryption of such encrypted data may be advantageously performed according to some embodiments of the invention, enabling for a high probability of success recovery of secret values with a reduced complexity.

Furthermore, the methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

While embodiments of the invention have been illustrated by a description of various examples, and while these embodiments have been described in considerable details, it is not the intent of the applicant to restrict or in any way limit the scope of the appended claims to such details. Additional advantages and modifications will readily appear to those skilled in the art. The invention in its broader aspects is therefore not limited to the specific details, representative methods, and illustrative examples shown and described.

The invention claimed is:

1. A decoder for decoding a signal received in a receiver from a transmitter through a transmission channel connecting said receiver and said transmitter, said signal comprising a vector of information symbols, the decoder being configured to determine at least an estimate of said vector of information symbols to decode said signal, said transmission channel being represented by a channel matrix comprising column vectors, said information symbols carrying information bits, wherein the decoder comprises:

a transformation unit configured to determine a set of auxiliary channel matrices, each auxiliary channel matrix being determined by performing a linear combination of at least one of the column vectors of said channel matrix;

a decomposition unit configured to determine a decomposition of each auxiliary channel matrix into an upper triangular matrix and an orthogonal matrix;

a matrix selection unit configured to select at least one auxiliary channel matrix among said set of auxiliary channel matrices depending on a selection criterion related to the components of said upper triangular matrices, wherein the decoder is configured to determine an auxiliary signal by multiplying the transpose of the orthogonal matrix corresponding to said selected auxiliary channel matrix by said received signal, the decoder being configured to determine said at least one estimate of said vector of information symbols from said auxiliary signal and from the upper triangular matrix corresponding to said selected auxiliary channel matrix by applying a decoding algorithm.

2. The decoder of claim 1, wherein said transformation unit is further configured to determine a set of transformation matrices, each transformation matrix comprising integer values and having a determinant of absolute value equal to one, and wherein said set of auxiliary channel matrices are determined by multiplying said channel matrix by each matrix of said set of transformation matrices.

3. The decoder of claim 1, wherein said matrix selection unit is further configured to divide each upper triangular matrix determined for each auxiliary channel matrix into a number of upper triangular sub-matrices and a number of rectangular sub-matrices depending on at least one sub-block decoding parameter chosen in a group consisting of a predefined number of sub-blocks, a set of sub-block lengths, and a predefined set of symbol estimation algorithms.

4. The decoder of claim 3, wherein said selection criterion is based on the value of at least one selection metric derived from the components of said upper triangular sub-matrices and/or said rectangular sub-matrices.

5. The decoder of claim 4, wherein said selection criterion depends on the value of said selection metric with respect to a metric threshold, said metric threshold being a real number.

6. The decoder of claim 5, wherein said metric threshold depends on the channel noise variance.

7. The decoder of claim 5, wherein said metric threshold is a function of at least one sub-block decoding parameter.

8. The decoder of claim 7, wherein the decoder is further configured to divide said auxiliary signal into a number of sub-vectors and to divide said vector of information symbols into a number of sub-vectors depending on said predefined number of sub-blocks and said set of sub-block lengths, the decoder being further configured to determine at least one estimate of each sub-vector of information symbols by applying a symbol estimation algorithm from said predefined set of symbol estimation algorithms.

9. The decoder of claim 8, wherein a different symbol estimation algorithm is applied for each sub-vector of information symbols.

10. The decoder of claim 9, wherein said symbol estimation algorithm is chosen in a group consisting of a sequential decoding algorithm, a ZF decoding algorithm, a ZF-DFE decoding algorithm and an MMSE decoding algorithm.

11. The decoder of claim 10, wherein it is further configured to perform a lattice reduction and/or MMSE-GDFE preprocessing on said selected at least one auxiliary channel matrix.

12. The decoder of claim 11, wherein it is configured to determine a plurality of estimates of each sub-vector of information symbols for delivering log-likelihood ratio values corresponding to said information bits.

13. A receiver for receiving and decoding a signal received in said receiver from a transmitter through a transmission channel connecting said receiver and said transmitter, said receiver comprises a decoder, said signal comprising a vector of information symbols, the decoder being configured to determine at least an estimate of said vector of information symbols to decode said signal, said transmission channel being represented by a channel matrix comprising column vectors, said information symbols carrying information bits, the decoder comprising a transformation unit configured to determine a set of auxiliary channel matrices, each auxiliary channel matrix being determined by performing a linear combination of at least one of the column vectors of said channel matrix;

a decomposition unit configured to determine a decomposition of each auxiliary channel matrix into an upper triangular matrix and an orthogonal matrix;

a matrix selection unit configured to select at least one auxiliary channel matrix among said set of auxiliary channel matrices depending on a selection criterion related to the components of said upper triangular matrices, wherein the decoder is configured to determine an auxiliary signal by multiplying the transpose of the orthogonal matrix corresponding to said selected auxiliary channel matrix by said received signal, the decoder being configured to determine said at least one estimate of said vector of information symbols from said auxiliary signal and from the upper triangular matrix corresponding to said selected auxiliary channel matrix by applying a decoding algorithm.

14. The receiver of claim 13, wherein the receiver is a wireless device capable of receiving data in a wireless multiple-input multiple-output communication system.

15. The receiver of claim 13, wherein the receiver is an optical device capable of receiving data in an optical multiple-input multiple-output communication system.

16. A method of decoding a signal received in a receiver from a transmitter through a transmission channel connecting said receiver and said transmitter, said signal comprising a vector of information symbols, said method determining at least an estimate of said vector of information symbols to decode said signal, said transmission channel being represented by a channel matrix comprising column vectors, said information symbols carrying information bits, wherein said method comprising:

determining a set of auxiliary channel matrices, each auxiliary channel matrix being determined by performing a linear combination of at least one of the column vectors of said channel matrix;

decomposing each auxiliary channel matrix into an upper triangular matrix and an orthogonal matrix;

selecting at least one auxiliary channel matrix among said set of auxiliary channel matrices and its corresponding upper triangular matrix and orthogonal matrix depending on a selection criterion related to the components of said upper triangular matrices;

wherein said method further comprises determining an auxiliary signal by multiplying the transpose of the orthogonal matrix corresponding to said selected auxiliary channel matrix with said received signal, and determining said at least one estimate of said vector of information symbols from said auxiliary signal and the upper triangular matrix corresponding to said selected auxiliary channel matrix by applying a decoding algorithm.

17. A computer program product for decoding a signal received in a receiver from a transmitter through a transmission channel connecting said receiver and said transmitter, said signal comprising a vector of information symbols, said signal being decoded by determining at least an estimate of said vector of information symbols, said transmission channel being represented by a channel matrix comprising column vectors, said information symbols carrying information bits, the computer program product comprising a non-transitory computer readable storage medium, and instructions stored on the non-transitory computer readable storage medium that, when executed by a processor, cause the processor to:

determine a set of auxiliary channel matrices, each auxiliary channel matrix being determined by performing a linear combination of at least one of the column vectors of said channel matrix;

decompose each auxiliary channel matrix into an upper triangular matrix and an orthogonal matrix;

select at least one auxiliary channel matrix among said set of auxiliary channel matrices and its corresponding upper triangular matrix and orthogonal matrix depending on a selection criterion related to the components of said auxiliary upper triangular matrices;

wherein said processor being further caused to determine an auxiliary signal by multiplying the transpose of the orthogonal matrix corresponding to said selected auxiliary channel matrix with said received signal, and determine said at least one estimate of said vector of information symbols from said auxiliary signal and the upper triangular matrix corresponding to said selected auxiliary channel matrix by applying a decoding algorithm.

* * * * *